United States Patent [19]

Galeazzi

[11] 3,997,706
[45] Dec. 14, 1976

[54] PROCESS FOR THE CHLOROMETHYLATION OF STYRENE-DIVINYLBENZENE COPOLYMERS

[75] Inventor: Lucio Galeazzi, Borsano-Busto Arsizio (Varese), Italy

[73] Assignee: Montedison Fibre S.p.A., Milan, Italy

[22] Filed: Nov. 27, 1974

[21] Appl. No.: 527,839

[30] Foreign Application Priority Data

Nov. 29, 1973   Italy ................................ 31929/73

[52] U.S. Cl. ................................. 526/41; 526/19; 526/55; 260/67 A
[51] Int. Cl.² .......................................... C08F 8/24
[58] Field of Search .... 260/96 HA, 93.5 A, 88.2 S; 450/615.5, 618; 526/41, 19

[56] References Cited

UNITED STATES PATENTS

| 3,297,648 | 1/1967 | Corte et al. | 260/93.5 A X |
|---|---|---|---|
| 3,311,602 | 3/1967 | Raley | 260/93.5 A |
| 3,417,066 | 12/1968 | Corte et al. | 260/93.5 A X |
| 3,425,990 | 2/1969 | Corte et al. | 260/93.5 A X |
| 3,812,061 | 5/1974 | Barrett | 260/93.5 A X |

Primary Examiner—William F. Hamrock

[57] ABSTRACT

There is disclosed a process for chloromethylating styrene-divinylbenzene copolymers by treating the copolymers with methylal and thionyl chloride in a molar ratio not exceeding 2:1 and in the presence of a catalyst of the Friedel-Crafts type or which consists of an acid.

As is known, the chloromethylation of cross-linked aromatic polymers of the styrene-divinylbenzene type is an important stage in the preparation of anionic exchange resins.

3 Claims, No Drawings

PROCESS FOR THE CHLOROMETHYLATION OF STYRENE-DIVINYLBENZENE COPOLYMERS

THE PRIOR ART

Processes for the chloromethylation of high molecular weight vinyl-aromatic compounds based on use of different chloromethylating agents are already known. The chloromethylating agents have included, for instance, chloromethyl-methyl ether, mixtures of paraformaldehyde and hydrochloric acid, mixtures of methylal (or formaldehyde polymers of relatively low molecular weight) and aluminum chloride, or mixtures consisting of formaldehyde polymers of relatively low molecular weight, chlorosulphonic acid and alcohols or other polar liquids containing oxygen which are incapable of dissolving compounds of high molecular weight.

Also known is a process for the chloromethylation of styrene-divinylbenzene copolymers which consists in treating the polymers to be chloromethylated with a mixture of methylal, sulphoryl chloride and a Friedel-Crafts catalyst.

However, the processes of the prior art have a number of drawbacks such as, for instance:

the use of gaseous HCl;

the use of highly poisonous chloromethyl methyl ether; and the fact that the chloromethylated copolymers obtained are characterized by an appreciable additional cross-linking, particularly when the starting copolymers have a high degree of cross-linking such as, for instance, the styrene-divinylbenzene copolymers which have a permanent porosity.

THE PRESENT INVENTION

An object of this invention is to provide a process for chloromethylating styrene-divinylbenzene copolymers which is free of the drawbacks of the prior art processes.

This and other objects are accomplished by the invention in accordance with which chloromethylic groups are introduced successfully into styrene-divinylbenzene copolymers without incurring the prior art disadvantages and drawbacks by treating the copolymers with a mixture of methylal and thionyl chloride in a molar ratio not exceeding 2:1 and in the presence of a catalyst which is of the Friedel-Crafts type or consists of an acid.

More particularly, by the process of this invention additional cross-linking of the styrene-divinylbenzene copolymers during chloromethylation thereof is reduced to a minimum. This is advantageous since the additional cross-linking is undesirable inasmuch as it makes the copolymer less permeable to the amines (e.g., trimethylamine) used in the subsequent amination reaction with the result that not all of the chloromethylic groups introduced into the copolymer can take part in the amination reaction.

The catalyst used in the present process may be either of the Friedel-Crafts type or may be selected from among the acids. For instance, it may be chlorosulphonic acid.

Of the Friedel-Crafts catalysts, stannic chloride is particularly suitable because, being a liquid it is easily metered and, moreover, has the advantage of being totally soluble in toluene and thus of having considerable affinity for the basic styrene copolymers.

Satisfactory results are also obtained using zinc chloride as catalyst.

In the present process, the chloromethylation reaction can be carried out at temperatures comprised between 20° C and 60° C, more particularly between 30° C and 45° C, and for reaction times ranging up to 6 - 7 hours.

As a critical requirement, the methylal/thionyl chloride molar ratio must not exceed 2:1. In general, it is comprised between 2:1 and 0.5:1. A 1:1 ratio is particularly advantageous.

In practice, the process of this invention can be carried out by different operating procedures. Thus, for instance, the starting copolymer may be caused to absorb methylal and the thionyl chloride and catalyst then metered gradually to the reaction medium, followed by heating of the mass to the desired temperature. Alternatively, the copolymer may be preimbibed in methylal or in thionyl chloride followed by dosing of the other reactant and the catalyst. In still another embodiment, the copolymer may be imbibed with the pre-formed chloromethylating mixture.

Moreover, instead of using methylal, it is possible to use paraformium/methanol mixtures in molar ratios $CH_3OH/CH_2O \leq 2/1$, preferably 1:1. In that case, the polymer is imbibed with a swelling solvent such as, for instance, 1,2-dichloroethane, prior to the chloromethylation.

The following Examples are given to illustrate the invention and are not intended to be limiting.

EXAMPLE 1

200 g of porous styrene-divinylbenzene copolymer were imbibed for 1 hour at 35° C in 500 g of methylal in a reflux flask. After cooling down to room temperature, 600 g of thionyl chloride and then 50 g of $SnCl_4$ were gradually introduced into the reaction medium under stirring and cooling of the system.

The temperature was then brought up to 45° C and the reaction was carried on for 6 hours.

At the end of the reaction, the reaction mass was cooled down and water was gradually introduced in order to decompose the reactants still present in the mass. Thereby was obtained a chloromethylated copolymer showing a chlorine content of 19.1%.

The chloromethylated copolymer, treated with an aqueous trimethylamine solution according to the known technique, supplied a strongly basic type 1 anionic ion-exchanger with an exchanging capacity (referred to the Cl form) of 3.84 milliequivalent/g of dry product.

EXAMPLE 2

In this test Example 1 was repeated, using the same quantities of reactants and the same operational procedures, but replacing the stannic chloride by 100 g of $ZnCl_2$.

Thereby a chloromethylated copolymer was obtained having a chlorine content of 18.4% which, transformed into a resin in the same way as in Example 1, showed an exchange capacity of 3.76 milliequivalent/g of dry product.

EXAMPLE 3

This example is given in order to demonstrate the critical character of the methylal/thionyl chloride ratio.

The procedure was the same as in Example 1, using 640 g of methylal, 440 g of $SOCl_2$ and 50 g of $SnCl_4$ (methylal/$SOCl_2$ molar ratio = 2.1:1).

The product obtained had a Cl content of 1.7% and thus was a product not transformable into an exchange resin.

EXAMPLE 4

100 g of porous styrene-divinylbenzene copolymer were suspended in 400 cc of 1,2-dichloroethane. This mixture was then heated at 40° C for 1 hour.

After cooling down to a temperature ≤ 18° C, 80 g of paraformium and 80 g of methanol were introduced into the reaction flask.

Successively, under cooling and stirring, within 2 – 3 hours, 300 cc of thionyl chloride were introduced dropwise into the reaction flask.

At the end of the metering of the $SO Cl_2$, 50 g of $Zn Cl_2$ dissolved in the least quantity of methanol were gradually charged to the flask.

At the end of the reaction, after quenching with water, washing and neutralization, a chloromethylated copolymer was recovered which had a chlorine content of 17.3%.

By amination with trimethylamine in a 40% aqueous solution, a strongly basic, type 1 anionic resin was obtained which showed an exchange capacity (referred to the form $Cl^-$) of 3.48 m²/g of dry product.

EXAMPLE 5

100 g of porous styrene-divinylbenzene copolymer were suspended in 350 cc of methylal and were then left to be imbibed for 1 hour at 30° – 40° C in a 4-necked flask fitted with a stirrer, a thermometer and a reflux cooler.

The suspension was cooled down to a temperature ≤ 15° C and into the reaction flask were then introduced dropwise within 30 minutes 300 cc of thionyl chloride.

At the end of the metering of the thionyl chloride there were added under cooling within 1 hour, 150 cc of chlorosulphonic acid.

The reaction mixture was then brought up to 45° C and the chloromethylation reaction was started at this temperature and carried on for 6 hours.

At the end of the reaction the reaction mass was cooled down and water was slowly introduced into the reaction flask kept under cooling. At the end of the exothermic quenching reaction with water, the chloromethylated copolymer was washed with water in excess until it became neutral. When analyzed, the product thus obtained, showed a chlorine content of 19.8%.

What is claimed is:

1. A process for the chloromethylation of styrene-divinylbenzene copolymers by using a methylating agent, a chlorine donor and a catalyst, characterized in that the copolymer to be chloromethylated is treated in either the presence or absence of swelling agents, and of inert dispersants, with a mixture of methylal and thionyl chloride in the presence of a Friedel-Crafts type catalyst or of a catalyst consisting of an acid, the methylal/thionyl chloride ratio being comprised between 0.5:1 and 2:1.

2. The process according to claim 1, characterized in that the catalyst is stannic chloride or zinc chloride.

3. The process according to claim 1, characterized in that the catalyst is chlorosulphonic acid.

* * * * *

UNITED STATES PATENT OFFICE
CERTIFICATE OF CORRECTION

Patent No. 3,997,706  Dated December 14, 1976

Inventor(s) Lucio GALEAZZI

It is certified that error appears in the above-identified patent and that said Letters Patent are hereby corrected as shown below:

Heading, item [73] should read

- - - Montedison S.p.A., Milan, Italy - - - not "Montedison Fibre S.p.A., Milan, Italy".

Signed and Sealed this

Eighteenth Day of July 1978

[SEAL]

Attest:

RUTH C. MASON
Attesting Officer

DONALD W. BANNER
Commissioner of Patents and Trademarks